(12) United States Patent
Gill

(10) Patent No.: US 7,203,037 B2
(45) Date of Patent: Apr. 10, 2007

(54) METHOD AND APPARATUS FOR PROVIDING A DUAL CURRENT-PERPENDICULAR-TO-PLANE (CPP) GMR SENSOR WITH IMPROVED TOP PINNING

(75) Inventor: Hardayal Singh Gill, Palo Alto, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 426 days.

(21) Appl. No.: 10/811,525

(22) Filed: Mar. 29, 2004

(65) Prior Publication Data

US 2005/0213258 A1 Sep. 29, 2005

(51) Int. Cl.
 *G11B 5/39* (2006.01)
(52) U.S. Cl. .................... 360/314; 360/324.11
(58) Field of Classification Search ........... 360/314, 360/324.11
See application file for complete search history.

(56) References Cited

U.S. PATENT DOCUMENTS

| | | | |
|---|---|---|---|
| 6,219,208 B1 | 4/2001 | Gill | |
| 6,295,187 B1 | 9/2001 | Pinarbasi | |
| 6,317,298 B1 | 11/2001 | Gill | |
| 6,680,827 B2 * | 1/2004 | Li et al. | 360/314 |
| 6,781,798 B2 * | 8/2004 | Gill | 360/314 |
| 6,866,751 B2 * | 3/2005 | Gill et al. | 204/192.2 |
| 7,027,268 B1 * | 4/2006 | Zhu et al. | 360/314 |
| 2001/0004798 A1 | 6/2001 | Gill | |
| 2002/0191348 A1 * | 12/2002 | Hasegawa et al. | 360/314 |
| 2003/0086217 A1 | 5/2003 | Pinarbasi | |

* cited by examiner

*Primary Examiner*—Jefferson Evans
(74) *Attorney, Agent, or Firm*—David W. Lynch; Chambliss, Bahner & Stophel

(57) ABSTRACT

A method and apparatus for providing a dual current-perpendicular-to-plane (CPP) GMR sensor with improved top pinning is disclosed. In the passive regions of the sensor, a tri-level biasing layer is formed proximate to the top self-pinned layer. The tri-level biasing layer includes a first metal oxide layer, a layer of alpha-$Fe_2O_3$ and a second metal oxide layer. The pinning of the top self-pinned layer is enhanced by the layer of alpha-$Fe_2O_3$. The layer of alpha-$Fe_2O_3$ pins the top portion of the pinned layer by providing higher coercivity ($H_C$) to the pinned layer.

32 Claims, 7 Drawing Sheets

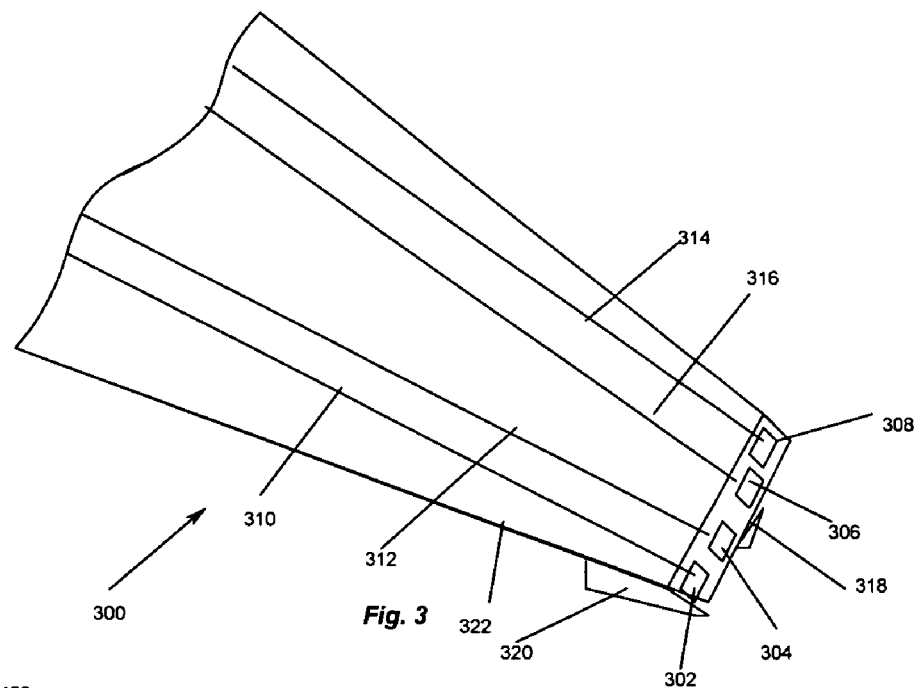
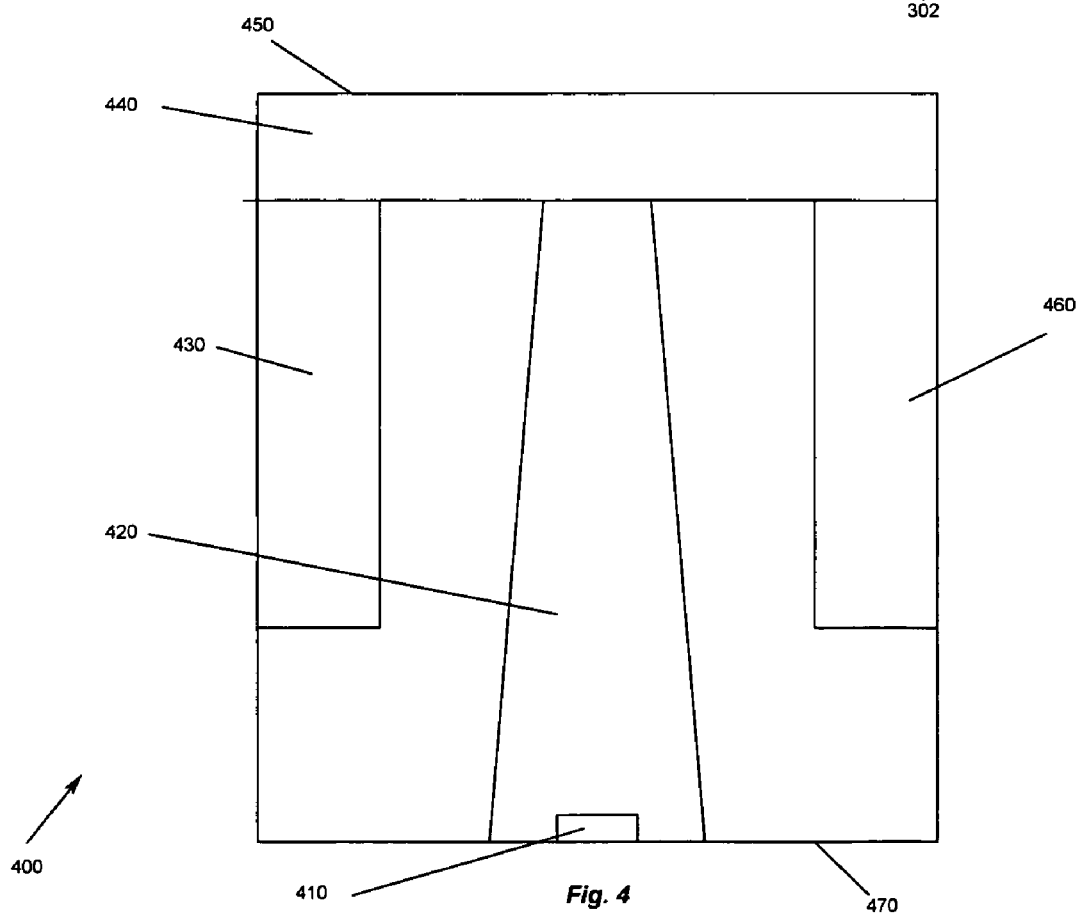

METHOD AND APPARATUS FOR PROVIDING A DUAL CURRENT-PERPENDICULAR-TO-PLANE (CPP) GMR SENSOR WITH IMPROVED TOP PINNING

BACKGROUND OF THE INVENTION

1. Field of the Invention

This invention relates in general to magnetic sensors, and more particularly to a method and apparatus for providing a dual current-perpendicular-to-plane (CPP) GMR sensor with improved top pinning.

2. Description of Related Art

Magnetic recording is a key segment of the information-processing industry. While the basic principles are one hundred years old for early tape devices, and over forty years old for magnetic hard disk drives, an influx of technical innovations continues to extend the storage capacity and performance of magnetic recording products. For hard disk drives, the areal density or density of written data bits on the magnetic medium has increased by a factor of more than two million since the first disk drive was used for data storage. Areal density continues to grow due to improvements in magnetic recording heads, media, drive electronics, and mechanics.

Magnetic recording heads have been considered the most significant factor in areal-density growth. The ability of the magnetic recording heads to both write and subsequently read magnetically recorded data from the medium at data densities well into the gigabits per square inch (Gbits/in$^2$) range gives hard disk drives the power to remain the dominant storage device for many years to come.

Important components of computing platforms are mass storage devices including magnetic disk and magnetic tape drives, where magnetic tape drives are popular, for example, in data backup applications. Write and read heads are employed for writing magnetic data to and reading magnetic data from the recording medium. The read and write heads are connected to processing circuitry that operates according to a computer program to implement the writing and reading functions.

A magnetoresistive (MR) sensor changes resistance in the presence of a magnetic field. Recorded data can be read from a recorded magnetic medium, such as a magnetic disk, because the magnetic field from the recorded magnetic medium causes a change in the direction of magnetization in the read element, which causes a corresponding change in the sensor resistance.

A magnetoresistive (MR) sensor detects magnetic field signals through the resistance changes of a sensing element as a function of the strength and direction of magnetic flux being sensed by the sensing element. Conventional MR sensors, such as those used as MR read heads for reading data in magnetic recording disk and tape drives, operate on the basis of the anisotropic magnetoresistive (AMR) effect of the bulk magnetic material, which is typically permalloy. A component of the read element resistance varies as the square of the cosine of the angle between the magnetization direction in the read element and the direction of sense current through the read element. Recorded data can be read from a magnetic medium, such as the magnetic disk in a magnetic disk drive, because the external magnetic field from the recorded magnetic medium (the signal field) causes a change in the direction of magnetization in the read element, which in turn causes a change in resistance of the read element. This change in resistance may be used to detect magnetic transitions recorded on the recording media.

In the past several years, prospects of increased storage capacity have been made possible by the discovery and development of sensors based on the giant magnetoresistance (GMR) effect, also known as the spin valve effect. In a spin valve sensor, the GMR effect varies as the cosine of the angle between the magnetization of the pinned layer and the magnetization of the free layer. Magnetic sensors utilizing the GMR effect are found in mass storage devices such as, for example, magnetic disk and tape drives and are frequently referred to as spin valve sensors. In operation, a sense current is caused to flow through the read head and therefore through the sensor. The magnetic flux from the disc causes a rotation of the magnetization vector in at least one of the sheets, which in turn causes a change in the overall resistance of the sensor. As the resistance of the sensor changes, the voltage across the sensor changes, thereby producing an output voltage.

Recent hard disk drive designs have utilized the Current In-Plane (CIP) structure, where the sense current travels between the magnetic shields parallel to the sensor plate. Such a design has produced optimism that areal densities of 100 Gbits/in$^2$ are possible, However, research efforts continue to find even better read heads so that areal densities may be boosted into the many hundreds of Gbits/in$^2$ range.

One such discovery is the Current-Perpendicular-to-Plane (CPP) structure, whereby the sense current travels from one magnetic shield to the other, perpendicular to the sensor plate. The CPP head provides an advantage over the CIP head because as the sensor size becomes smaller, the output voltage of a CPP head becomes larger, thus providing an output voltage that is inversely proportional to the square root of the sensor area.

For ultra high areal density applications, there are at least two limitations that result from these arrangements. First, the read gap in that arrangement is limited by the spin valve thickness. Second, due to the current perpendicular-to-the-plane model, the magnetoresistance of this spin valve structure is insufficient for ultrahigh areal density applications. In a dual CPP GMR sensor, a pair of magnetic shields serves as electrical contact leads to carry sense current flowing perpendicular-to-the-plane of the magnetoresistance device.

Furthermore, in a dual CPP GMR sensor, the first and second pinned layers of the AP pinned structure are typically made of cobalt (Co). Unfortunately, cobalt has high coercivity, high magnetostriction and low resistance. When the first and second pinned layers of the AP pinned structure are formed they are sputter deposited in the presence of a magnetic field that is oriented perpendicular to the ABS. This sets the easy axis (e.a.) of the pinned layers perpendicular to the ABS.

In the self-pinned spin valve, the self-pinned layer may be formed of a single layer of a single material or may be a composite layer structure of multiple materials. It is noteworthy that a self-pinned spin valve requires no additional external layers applied adjacent thereto to maintain a desired magnetic orientation and, therefore, is considered to be an improvement over the anti-ferromagnetically pinned spin valve.

In the presence of some magnetic fields, the magnetic moment of the pinned layer can be rotated anti-parallel to the pinned direction. The question then is whether the magnetic moment of the pinned layer will return to the pinned direction when the magnetic field is relaxed. This depends upon the strength of the exchange coupling field and the coercivity of the pinned layer. If the coercivity of the pinned layer exceeds the exchange coupling field, the exchange coupling field will not be strong enough to bring the magnetic moment of the pinned layer back to the original pinned direction. Until the magnetic spins of the pinning layer are reset the read head is rendered inoperative. On the other hand, the sense current flowing through the CPP element may disturb the direction of magnetization of the top self-pinned layer. In other words, the self-pinned layer is thin so that its demagnetization field may not be greater than the sense current fields acting thereon.

It can be seen that there is a need for a method and apparatus for providing a dual current-perpendicular-to-plane (CPP) GMR sensor with improved top pinning.

SUMMARY OF THE INVENTION

To overcome the limitations described above, and to overcome other limitations that will become apparent upon reading and understanding the present specification, the present invention discloses a method and apparatus for providing a dual current-perpendicular-to-plane (CPP) GMR sensor with improved top pinning.

The present invention solves the above-described problems by providing in the passive regions of the sensor a tri-level biasing layer proximate to the top self-pinned layer. The tri-level biasing layer includes a layer of metal oxide layer such as a NiO layer, a layer of alpha-$Fe_2O_3$ and another metal oxide layer such as NiO. The pinning of the top self-pinned layer is enhanced by the layer of alpha-$Fe_2O_3$. The layer of alpha-$Fe_2O_3$ pins the top portion of the pinned layer by providing higher coercivity ($H_C$) to the pinned layer. The bottom NiO layer serves as an insulation layer to the hard bias layer. The top NiO layer coupled the NiFe at the top and removes exchange coupling to the hard bias layer. Still further, the trilayer of NiO/alpha-$Fe_2O_3$/NiO allows for a thinner anti-ferromagnetic layer thereby providing for a thinner overall sensor.

A dual CPP GMR sensor in accordance with the principles of the present invention includes a first magnetic shield formed of an electrically conductive and magnetically shielding material, a second magnetic shield formed of an electrically conductive and magnetically shielding material, the first and the second magnetic shields disposed to define a read gap therebetween, a spin valve structure disposed between the first and second magnetic shields, the spin valve structure including a dual spin valve arrangement, the dual spin valve arrangement having a top and bottom spin self-pinned layer and a free ferromagnetic layers disposed therebetween and a biasing layer disposed proximate the top self-pinned layer in a passive region for pinning the top self-pinned layer.

In another embodiment of the present invention, a magnetic storage system is provided. The magnetic storage system includes a magnetic storage medium having a plurality of tracks for recording of data and a dual CPP GMR sensor maintained in a closely spaced position relative to the magnetic storage medium during relative motion between the magnetic transducer and the magnetic storage medium, the dual CPP GMR sensor further including a first magnetic shield formed of an electrically conductive and magnetically shielding material, a second magnetic shield formed of an electrically conductive and magnetically shielding material, the first and the second magnetic shields disposed to define a read gap therebetween, a spin valve structure disposed between the first and second magnetic shields, the spin valve structure including a dual spin valve arrangement, the dual spin valve arrangement having a top and bottom spin self-pinned layer and a free ferromagnetic layers disposed therebetween and a biasing layer disposed proximate the top self-pinned layer in a passive region for pinning the top self-pinned layer.

In another embodiment of the present invention, a method providing a dual current-perpendicular-to-plane (CPP) GMR sensor with improved top pinning is provided. The method includes forming a first magnetic shield of an electrically conductive and magnetically shielding material, forming a second magnetic shield of an electrically conductive and magnetically shielding material, the first and the second magnetic shields disposed to define a read gap therebetween, forming a spin valve structure between the first and second magnetic shields, the spin valve structure including a dual spin valve arrangement, the dual spin valve arrangement having a top and bottom spin self-pinned layer and a free ferromagnetic layers disposed therebetween and forming a biasing layer disposed proximate the top self-pinned layer in a passive region for pinning the top self-pinned layer.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 3 illustrates a slider mounted on a suspension according to an embodiment of the present invention;

FIG. 4 illustrates an ABS view of the slider and the magnetic head according to an embodiment of the present invention;

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for providing a dual current-perpendicular-to-plane (CPP)

GMR sensor with improved top pinning. In the passive regions of the sensor, a tri-level biasing layer is formed proximate to the top self-pinned layer. The tri-level biasing layer includes a layer of NiO, a layer of alpha-$Fe_2O_3$ and a layer of NiO. The pinning of the top self-pinned layer is enhanced by the layer of alpha-$Fe_2O_3$. The layer of alpha-$Fe_2O_3$ pins the top portion of the pinned layer by providing higher coercivity ($H_C$) to the pinned layer. The bottom NiO layer serves as an insulation layer to 9 the hard bias layer. The top NiO layer coupled the NiFe at the top and removes exchange coupling to the hard bias layer. Still further, the trilayer of NiO/alpha-$Fe_2O_3$/NiO allows for a thinner antiferromagnetic layer thereby providing for a thinner overall sensor.

Figure 1:
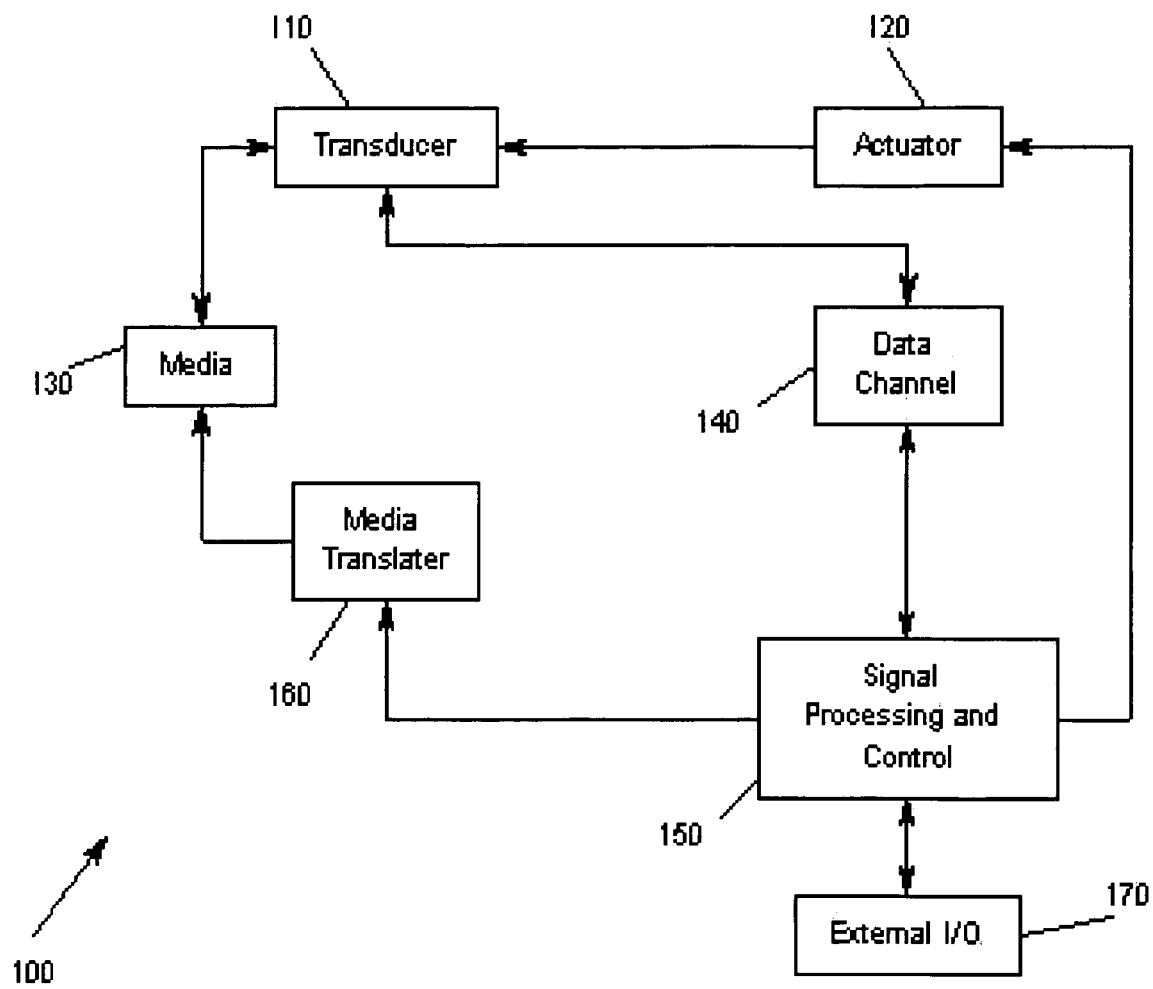
FIG. 1 illustrates a storage system according to an embodiment of the present invention.

FIG. 1 illustrates an exemplary storage system 100 according to the present invention. A transducer 110 is under control of an actuator 120, whereby the actuator 120 controls the position of the transducer 110. The transducer 110 writes and reads data on magnetic media 130. The read/write signals are passed to a data channel 140. A signal processor 150 controls the actuator 120 and processes the signals of the data channel 140 for data exchange with external Input/Output (I/O) 170. I/O 170 may provide, for example, data and control conduits for a desktop computing application, which utilizes storage system 100. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
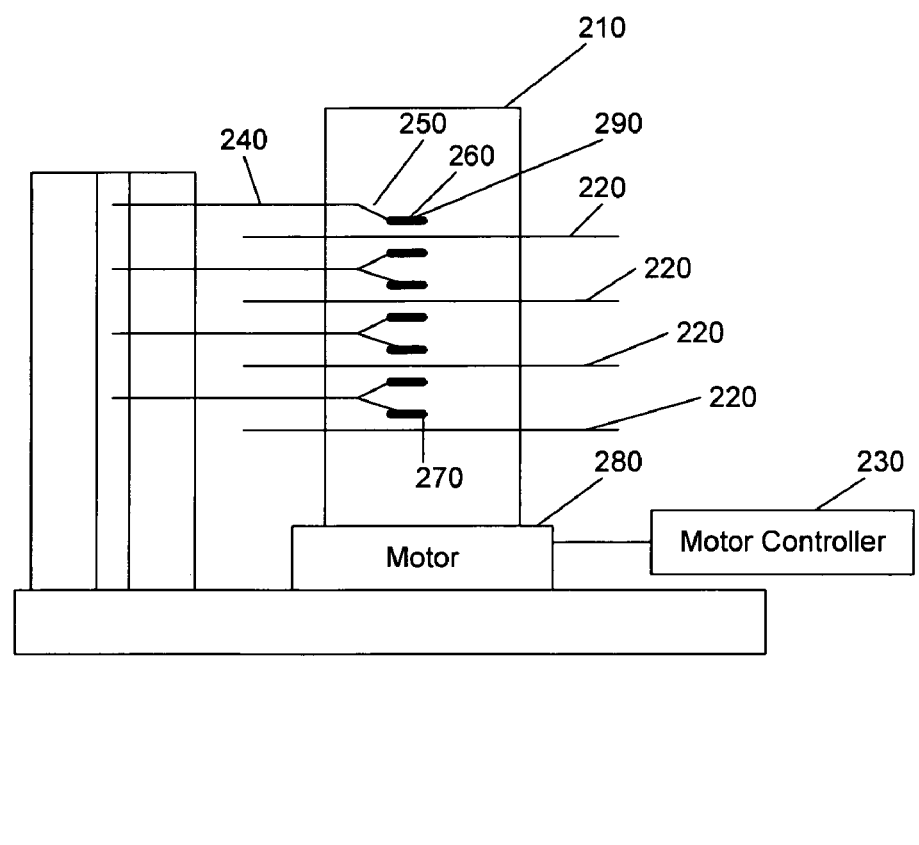
FIG. 2 illustrates one storage system according to an embodiment of the present invention.

FIG. 2 illustrates one particular embodiment of a multiple magnetic disk storage system 200 according to the present invention. In FIG. 2, a hard disk drive storage system 200 is shown. The system 200 includes a spindle 210 that supports and rotates multiple magnetic disks 220. The spindle 210 is rotated by motor 280 that is controlled by motor controller 230. A combined read and write magnetic head 270 is mounted on slider 260 that is supported by suspension 250 and actuator arm 240. Processing circuitry exchanges signals that represent information with read/write magnetic head 270, provides motor drive signals for rotating the magnetic disks 220, and provides control signals for moving the slider 260 to various tracks. Although a multiple magnetic disk storage system is illustrated, a single magnetic disk storage system is equally viable in accordance with the present invention.

The suspension 250 and actuator arm 240 position the slider 260 so that read/write magnetic head 270 is in a transducing relationship with a surface of magnetic disk 220. When the magnetic disk 220 is rotated by motor 280, the slider 240 is supported on a thin cushion of air (air bearing) between the surface of disk 220 and the ABS 290. Read/write magnetic head 270 may then be employed for writing information to multiple circular tracks on the surface of magnetic disk 220, as well as for reading information therefrom.

FIG. 3 illustrates a sensor assembly 300. In FIG. 3, a slider 320 is mounted on a suspension 322. First and second solder connections 302 and 308 connect leads from the sensor 318 to leads 310 and 314, respectively, on suspension 322 and third and fourth solder connections 304 and 306 connect to the write coil (not shown) to leads 312 and 316, respectively, on suspension 322.

FIG. 4 is an ABS view of slider 400 and magnetic head 410. The slider has a center rail 420 that supports the magnetic head 410, and side rails 430 and 460. The support rails 420, 430 and 460 extend from a cross rail 440. With respect to rotation of a magnetic disk, the cross rail 440 is at a leading edge 450 of slider 400 and the magnetic head 410 is at a trailing edge 470 of slider 400.

The above description of a typical magnetic recording disk drive system, shown in the accompanying FIGS. 1–4, is for presentation purposes only. Storage systems may contain a large number of recording media and actuators, and each actuator may support a number of sliders. In addition, instead of an air-bearing slider, the head carrier may be one that maintains the head in contact or near contact with the disk, such as in liquid bearing and other contact and near-contact recording disk drives.

Figure 5:
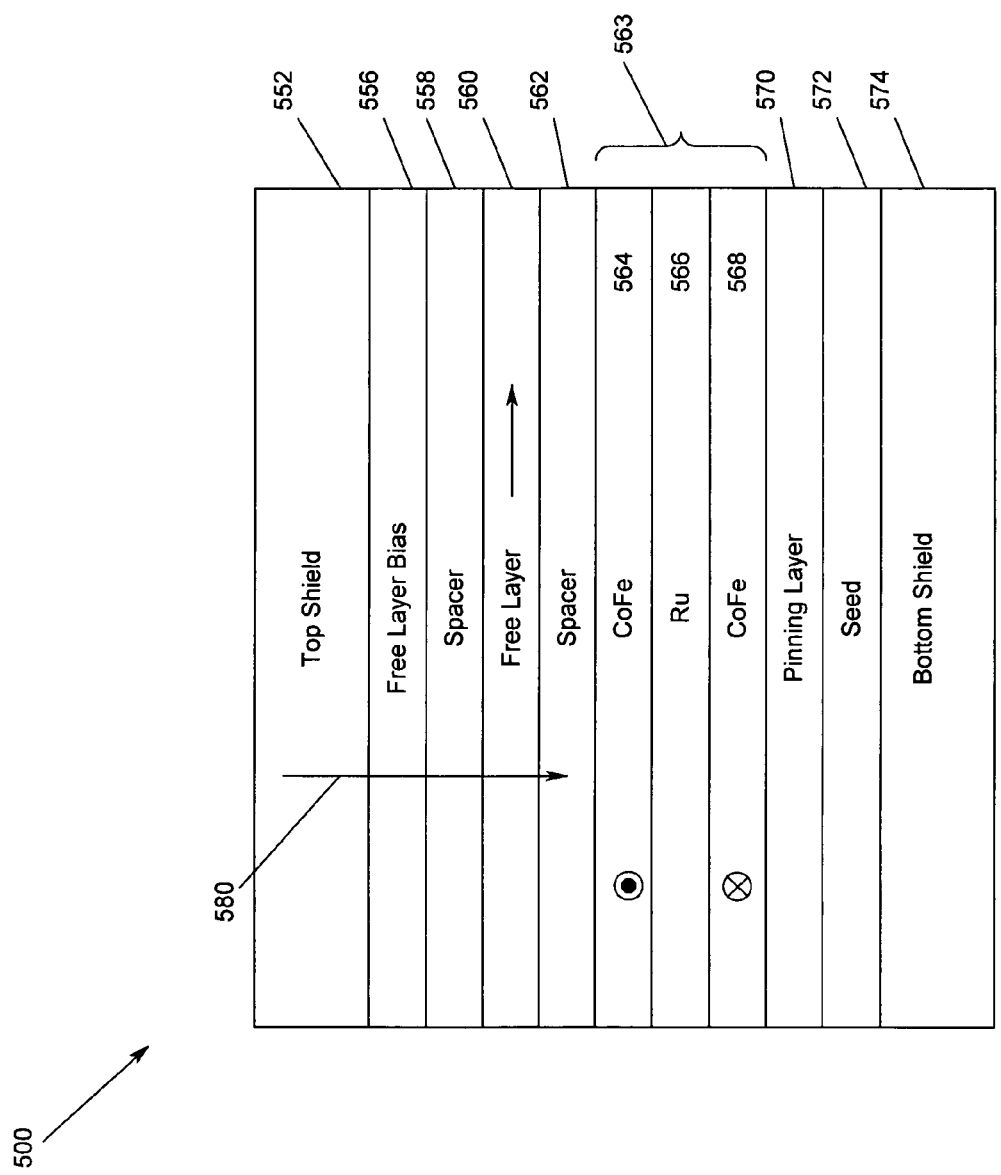
FIG. 5 shows an ABS view of a CPP type of spin valve wherein the current flow is perpendicular to the plane of the free layer.

FIG. 5 shows an ABS view 500 of a conventional CPP type of spin valve, wherein the current flow is perpendicular to the plane of the free layer. Spin valve head 500 includes top shield 552, bias layer 556, spacer layer 558, free layer 560, second spacer layer 562, pinned layer 563, pinning layer 570, seed layer 572 and bottom shield 574. Top shield 552 also acts as a shared pole in merged read/write heads. Bias layer 556 is an antiferromagnetic material, such as IrMn, PtMn, NiMn, etc. Spacer layers 558 and 562 may be formed of Cu, Au, Ag, NiFeCr, Al, Ru, etc. Free layer 560 is a ferromagnetic layer, such as NiFe and CoFe. The magnetization of free layer 560 is shown by an arrow on that layer. Pinned layer 563 is a synthetic antiferromagnet or SAF, and includes, for example, first CoFe layer 564, Ru spacer layer 566 and second CoFe layer 568.

When two ferromagnetic layers, such as CoFe layers 564 and 568 are separated by a spacer of an appropriate thickness, the two ferromagnetic layers couple strongly with magnetic moments anti-parallel as shown by the circled "X" (into the paper) and circled dot (out of the paper) on these layers. In FIG. 5, a synthetic antiferromagnet is used as pinned layer 563 to provide a reduced demagnetization field for providing magnetic stability. Alternatively, pinned layer 563 could be a single soft magnetic layer, such as CoFe. Pinning layer 570 is an antiferromagnetic material, for example, such as IrMn, PtMn, NiMn, etc.

Top shield 552 and bottom shield 574 act as electrodes for conducting a sense current. The sense current flows between top shield 552 and bottom shield 574 and through layers 556–572. This mode of operation, where the sense current 580 flows perpendicular to the plane of spacer layer 562, is referred to as current perpendicular-to-plane or CPP mode. Operation in CPP mode provides an enhanced GMR response.

CPP GMR heads as shown in FIG. 5 provide an enhanced GMR response compared to current-in-plane (CIP) GMR heads (which would have leads at the sides of at least some of layers 556–572 so that the current would flow between the side leads parallel to the layers 556–572).

Figure 6:
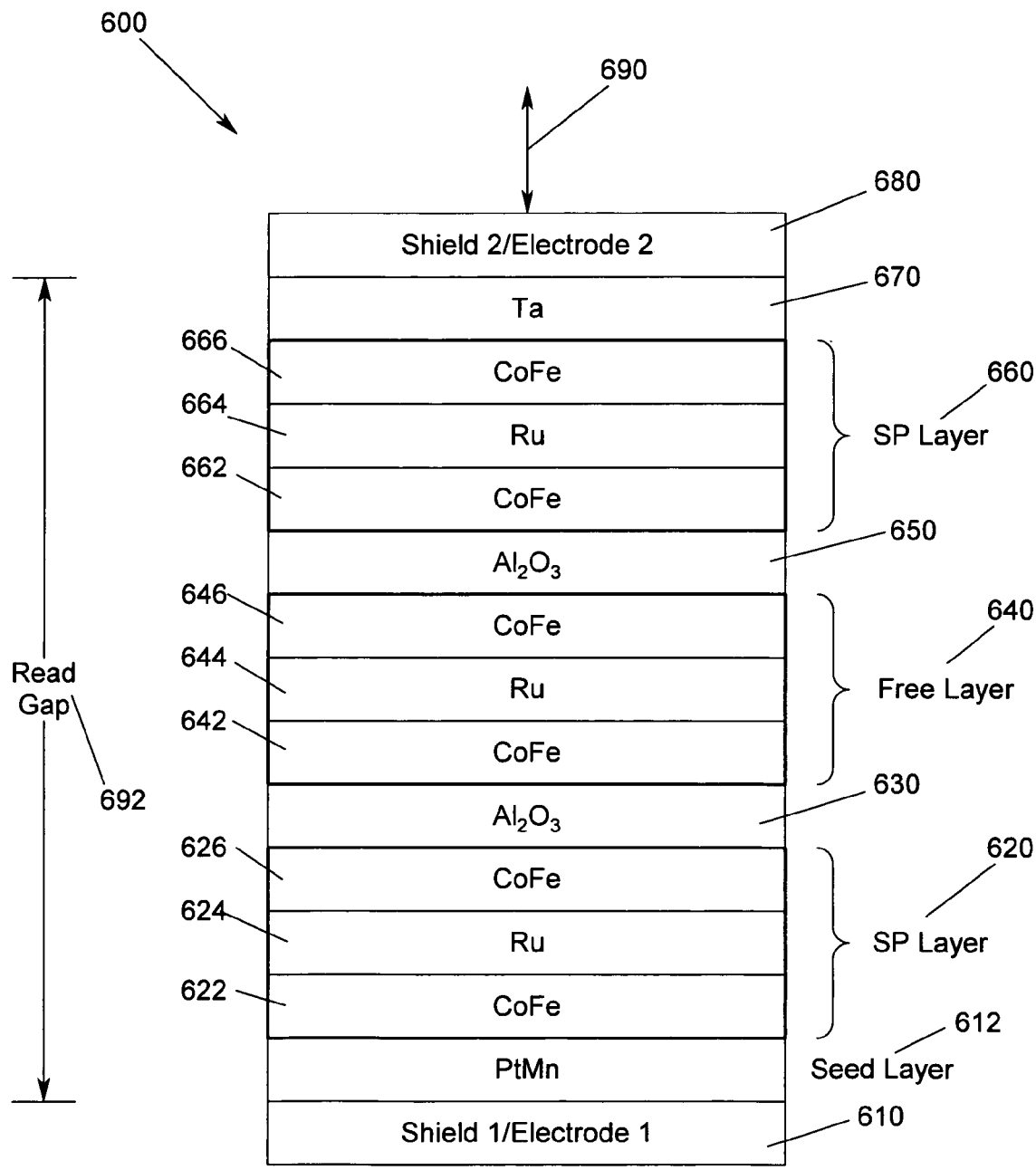
FIG. 6 shows a conventional dual CPP sensor using AP-Coupled free layer to generate magnetoresistance.

FIG. 6 shows a conventional dual CPP sensor 600 using AP-Coupled free layer to generate magnetoresistance. The dual CPP sensor 600 includes a first shield 610. The shield 610 may be formed of an electrically conductive and magnetically shielding material. A seed layer 612, for example of PtMn, is formed over the first shield 610. Seed layer 612 facilitates the growth of rest of the sensor structure. A bottom self-pinned layer 620 is formed over the seed layer 612. The bottom self-pinned layer 620 includes a first layer of CoFe 622, an interlayer of Ru 624 and a second layer of CoFe 626. A first barrier layer 630 is formed over the bottom self-pinned layer 620. The first barrier layer 630 may be, for example, a layer of $Al_2O_3$. The AP-coupled free layer 640 is formed over the first barrier layer 630. The AP-coupled free layer 640 may include a third layer of CoFe 642, an interlayer of Ru 644 and a fourth layer of CoFe 646. A second barrier layer 650 is formed over the AP-coupled free layer 640. A top self-pinned layer 660 is formed over the second barrier layer 650. The top self-pinned layer 660 may include a fifth layer of CoFe 662, an interlayer of Ru 664 and a six layer of CoFe 666. A Ta layer 670 is formed over the top self-pinned layer 660 and a second shield 680 is formed over the Ta layer 670. During operation, current 690 flows perpendicular to the plane of the layers. The first 610 and second 680 shields also act as the electrodes supplying current as well as detection electrodes.

The self-pinning of the top 660 and bottom 620 self-pinned layers is achieved through the perpendicular stress induced anisotropy caused by compressive stress at the air bearing surface and positive magnetostriction, for example, of the CoFe. The magnetization of the top 660 and bottom 620 self-pinned layers are properly oriented so that their magnetic orientations are at 180 degree from one another so that the signal adds. The layers between the barrier layers form the AP-coupled Free layer 640.

The read gap 692 is the length of the sensor between the first 610 and second 680 shield layers. It should be understood that the thinner the length of the read gap 692 the higher the linear read bit density of the read head 600. This means that more bits can be read per inch along the track of a rotating magnetic disk that enables an increase in the storage capacity of the magnetic disk drive. However, thinning the sensors to reduce the length of the read gap 692 results in other difficulties. As discussed above, in the presence of some magnetic fields the magnetic moment of the pinned layers 620, 660 can be rotated anti-parallel to the pinned direction and thereby rendering the read head inoperative. On the other hand, the sense current 690 flowing through the CPP element may disturb the direction of magnetization of the top self-pinned layer 660. In other words, the self-pinned layer 660 is thin so that its demagnetization field may not be greater than the sense current fields acting thereon.

Figure 7:
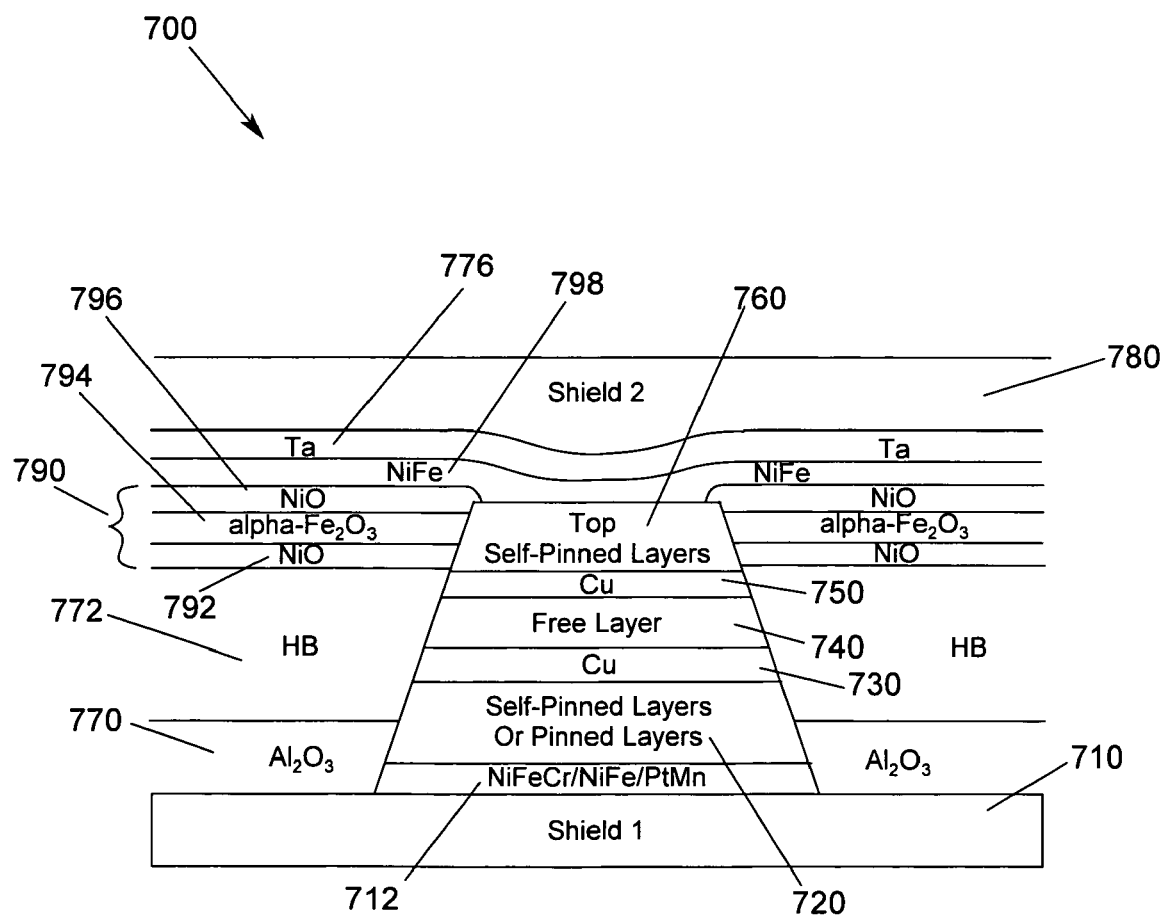
FIG. 7 illustrates a dual CPP GMR head 700 according to an embodiment of the present invention.

FIG. 7 illustrates a dual CPP GMR head 700 according to an embodiment of the present invention. In FIG. 7, a first shield is formed 710. A seed layer 712 is formed over the first shield layer 710. The seed layer 712 may include a layer of NiFeCr, a layer of NiFe and a layer of PtMn. A bottom self-pinned layer 720 is formed over the first shield 710. The bottom self-pinned layer 720 may include two ferromagnetic layers, .e.g., CoFe and an interlayer, e.g., Ru. A first spacer layer 730 is formed over the bottom self-pinned layer 720. The first spacer layer 730 may be, for example, a layer of copper. The AP-coupled free layer 740 is formed over the first spacer layer 730. The free layer 740 may include a first layer of CoFe, a layer of NiFe and a second layer of CoFe. A second spacer layer 750 is formed over the AP-coupled free layer 740. The second spacer layer 750 may also be, for example, a layer of copper. A top self-pinned layer 760 is formed over the second spacer layer. The top self-pinned layer 760 may include a first layer of CoFe, a layer of Ru and a second layer of CoFe.

A layer of $Al_2O_3$ 770 is formed in the passive areas adjacent to the bottom self-pinned layer 720 on both sides. A hard bias layer 772 is formed over the layer of $Al_2O_3$ 770. Adjacent the top self-pinned layer 760, a trilayer 790 of NiO 792, alpha-$Fe_2O_3$ 794 and NiO 796 is formed. A ferromagnetic layer 798, e.g., NiFe, is formed over the top anti-ferromagnetic (AFM) NiO layers 796 and the top self-pinned layer 760. A Ta layer 776 is formed over the NiFe layer 798 and a second shield 780 is formed over the Ta layer 776.

During operation, current flows perpendicular to the plane of the layers. The first 710 and second 780 shields also act as the electrodes supplying current as well as detection electrodes. The layers 792, 794, 796 in the stack 790 provide pinning to the NiFe layer 798 by exchange coupling and raising its Hc. The intra film exchange in the NiFe layer 798 then provides pinning to layer 760. The bottom NiO layer 792 serves as an insulation layer to the hard bias layer 772. The top NiO layer 796 couples the NiFe 798 at the top and removes exchange coupling to the hard bias layer 772. Still further, the layer of NiO 792, layer of alpha-$Fe_2O_3$ 794 and layer of NiO 796 allow a thinner anti-ferromagnetic layer 790 thereby providing for a thinner overall sensor.

Figure 8:
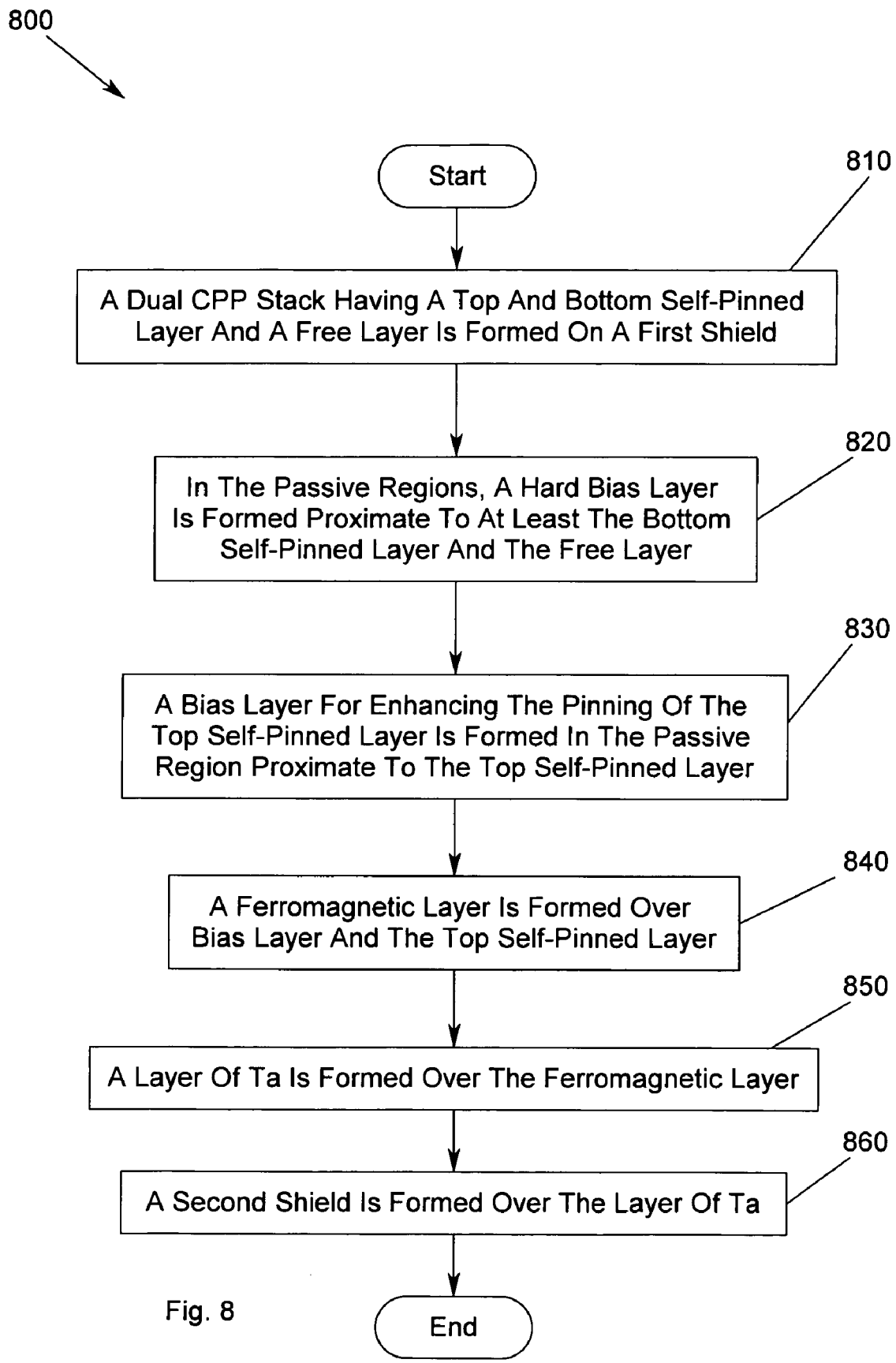
FIG. 8 is a flow chart of the method for providing a dual current-perpendicular-to-plane (CPP) GMR sensor with improved top pinning according to an embodiment of the present invention.

FIG. 8 is a flow chart of the method for providing a dual current-perpendicular-to-plane (CPP) GMR sensor with improved top pinning according to an embodiment of the present invention. In FIG. 8, a dual CPP stack having a top and bottom self-pinned layer and a free layer is formed on a first shield 810. In the passive regions, a hard bias layer is formed proximate to at least the bottom self-pinned layer and the free layer 820. A tri-level bias layer is formed in the passive region proximate to the top self-pinned layer 830. A ferromagnetic layer, e.g., NiFe, is formed over the tri-level bias layer and the top self-pinned layer 840. A layer of Ta is formed over the NiFe layer 850. A second shield is formed over the layer of Ta 860.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A dual current-perpendicular-to-plane (CPP) GMR sensor, comprising:
    a first magnetic shield formed of an electrically conductive and magnetically shielding material;
    a second magnetic shield formed of an electrically conductive and magnetically shielding material, the first and the second magnetic shields disposed to define a read gap therebetween;
    a spin valve structure disposed between the first and second magnetic shields, the spin valve structure including a dual spin valve arrangement, the dual spin valve arrangement having a top and bottom spin self pinned layer and a free ferromagnetic layers disposed therebetween; and
    a biasing layer disposed adjacent only the top self pinned layer in a passive region for pinning the top self pinned layer.

2. The dual CPP GMR sensor of claim 1 further comprising:
    a hard bias layer separate and distinct from the biasing layer formed proximate the bottom self-pinned layer in a passive region for biasing the bottom self-pinned layer;
    a first metal oxide layer disposed between the biasing layer and the hard bias layer for providing an insulation layer to the hard bias layer; and
    a second metal oxide layer formed above the biasing layer.

3. The dual CPP GMR sensor of claim 2, wherein the metal oxide layers further comprises NiO.

4. The dual CPP GMR sensor of claim 2 further comprises a ferromagnetic layer disposed over the second metal oxide layer and the self-pinned layer, wherein the second metal oxide layer removes exchange coupling to the hard bias layer.

5. The dual CPP GMR sensor of claim 4 further comprising a Ta layer formed between the ferromagnetic layer and the second shield.

6. The dual CPP GMR sensor of claim 5, wherein the ferromagnetic layer comprises NiFe.

7. The dual CPP GMR sensor of claim 1 further comprising a first and second metal oxide layer formed under and above the biasing layer.

8. The dual CPP GMR sensor of claim 7, wherein the metal oxide layers further comprises NiO.

9. The dual CPP GMR sensor of claim 8 further comprises a ferromagnetic layer disposed below the second shield and over the second metal oxide layer and the self-pinned layer, wherein the second metal oxide layer removes exchange coupling to the hard bias layer.

10. The dual CPP GMR sensor of claim 9 further comprising a Ta layer formed between the ferromagnetic layer and the second shield.

11. The dual CPP GMR sensor of claim 9, wherein the ferromagnetic layer comprises NiFe.

12. The dual CPP GMR sensor of claim 1, wherein the first and second shields function as electrodes for supplying current to the spin valve structure.

13. The dual CPP GMR sensor of claim 1, wherein the biasing layer comprises a layer of alpha-$Fe_2O_3$, the layer of alpha-$Fe_2O_3$ pinning the top self-pinned layer.

14. The dual CPP GMR sensor of claim 13, wherein the layer of alpha-$Fe_2O_3$ pins the top portion of the top self-pinned layer by providing higher coercivity ($H_C$) to the top self-pinned layer.

15. A magnetic storage system, comprising:
a magnetic storage medium having a plurality of tracks for recording of data; and
a dual CPP GMR sensor maintained in a closely spaced position relative to the magnetic storage medium during relative motion between the magnetic transducer and the magnetic storage medium, the dual CPP GMR sensor further comprising:
a first magnetic shield formed of an electrically conductive and magnetically shielding material;
a second magnetic shield formed of an electrically conductive and magnetically shielding material, the first and the second magnetic shields disposed to define a read gap therebetween;
a spin valve structure disposed between the first and second magnetic shields, the spin valve structure including a dual spin valve arrangement, the dual spin valve arrangement having a top and bottom spin self pinned layer and a free ferromagnetic layers disposed therebetween; and
a biasing layer disposed adjacent only the top self pinned layer in a passive region for pinning the top self-pinned layer.

16. The magnetic storage system of claim 15, wherein the CPP GMR sensor further comprises:
a hard bias layer separate and distinct from the biasing layer formed proximate the bottom self-pinned layer in a passive region for biasing the bottom self pinned layer;
a first metal oxide layer disposed between the biasing layer and the hard bias layer for providing an insulation layer to the hard bias layer; and
a second metal oxide layer formed above the biasing layer.

17. The magnetic storage system of claim 16, wherein metal oxide layers further comprises NiO.

18. The magnetic storage system of claim 16, wherein the CPP GMR sensor further comprises a ferromagnetic layer disposed over the second metal oxide layer and the self-pinned layer, wherein the second metal oxide layer removes exchange coupling to the hard bias layer.

19. The magnetic storage system of claim 18, wherein the CPP GMR sensor further comprises a Ta layer formed between the ferromagnetic layer and the second shield.

20. The magnetic storage system of claim 19, wherein the ferromagnetic layer comprises NiFe.

21. The magnetic storage system of claim 15, wherein the CPP GMR sensor further comprises a first and second metal oxide layer formed under and above the biasing layer.

22. The magnetic storage system of claim 21, wherein the metal oxide layers further comprises NiO.

23. The magnetic storage system of claim 22, wherein the CPP GMR sensor further comprises further comprises a ferromagnetic layer disposed below the second shield and over the second metal oxide layer and the self-pinned layer, wherein the second metal oxide layer removes exchange coupling to the hard bias layer.

24. The magnetic storage system of claim 23, wherein the CPP GMR sensor further comprises a Ta layer formed between the ferromagnetic layer and the second shield.

25. The magnetic storage system of claim 23, wherein the ferromagnetic layer comprises NiFe.

26. The magnetic storage system of claim 15, wherein the first and second shields function as electrodes for supplying current to the spin valve structure.

27. The magnetic storage system of claim 15, wherein the biasing layer comprises a layer of alpha-$Fe_2O_3$, the layer of alpha-$Fe_2O_3$ pinning the top self-pinned layer.

28. The magnetic storage system of claim 27, wherein the layer of alpha-$Fe_2O_3$ pins the top portion of the top self-pinned layer by providing higher coercivity ($H_C$) to the top self-pinned layer.

29. A method for providing a dual current-perpendicular-to-plane (CPP) GMR sensor with improved top pinning, comprising:
forming a first magnetic shield of an electrically conductive and magnetically shielding material;
forming a second magnetic shield of an electrically conductive and magnetically shielding material, the first and the second magnetic shields disposed to define a read gap therebetween;
forming a spin valve structure between the first and second magnetic shields, the spin valve structure including a dual spin valve arrangement, the dual spin valve arrangement having a top and bottom spin self-pinned layer and a free ferromagnetic layers disposed therebetween; and
forming a biasing layer disposed adjacent only the top self-pinned layer in a passive region for pinning the top self-pinned layer.

30. The method of claim 29 further comprising:
forming a hard bias layer separate and distinct from the biasing layer formed proximate the bottom self-pinned layer in a passive region for biasing the bottom self pinned layer;
forming a first metal oxide layer between the biasing layer and the hard bias layer for providing an insulation layer to the hard bias layer; and
forming a second metal oxide layer above the biasing layer.

31. The method of claim 30 further comprises forming a ferromagnetic layer over the second metal oxide layer and the self-pinned layer, wherein the second metal oxide layer removes exchange coupling to the hard bias layer.

32. The method of claim 31 further comprising forming a Ta layer between the ferromagnetic layer and the second shield.

* * * * *

UNITED STATES PATENT AND TRADEMARK OFFICE
CERTIFICATE OF CORRECTION

PATENT NO. : 7,203,037 B2
APPLICATION NO. : 10/811525
DATED : April 10, 2007
INVENTOR(S) : Gill It is certified that error appears in the above-identified patent and that said Letters Patent is hereby corrected as shown below:

Col. 8, Line 39: "self pinned layer" should read -- self-pinned layer --
Col. 8, Line 42: "self pinned layer" should read -- self-pinned layer --
Col. 8, Line 43: "self pinned layer" should read -- self-pinned layer --
Col. 9, Line 44: "self pinned layer" should read -- self-pinned layer --
Col. 9, Line 46: "self pinned layer" should read -- self-pinned layer --
Col. 9, Line 53: "self pinned layer" should read -- self-pinned layer --
Col. 10, Line 12: "sensor futher comprises further comprises a" should read -- sensor further comprises a --
Col. 10, Line 52: "self pinned layer" should read -- self-pinned layer --

Signed and Sealed this

Twelfth Day of June, 2007

JON W. DUDAS
*Director of the United States Patent and Trademark Office*